Feb. 21, 1956  W. J. OWEN  2,735,657
REFRIGERATING APPARATUS FOR AUTOMOBILES WITH REHEAT MEANS
Filed Jan. 19, 1953
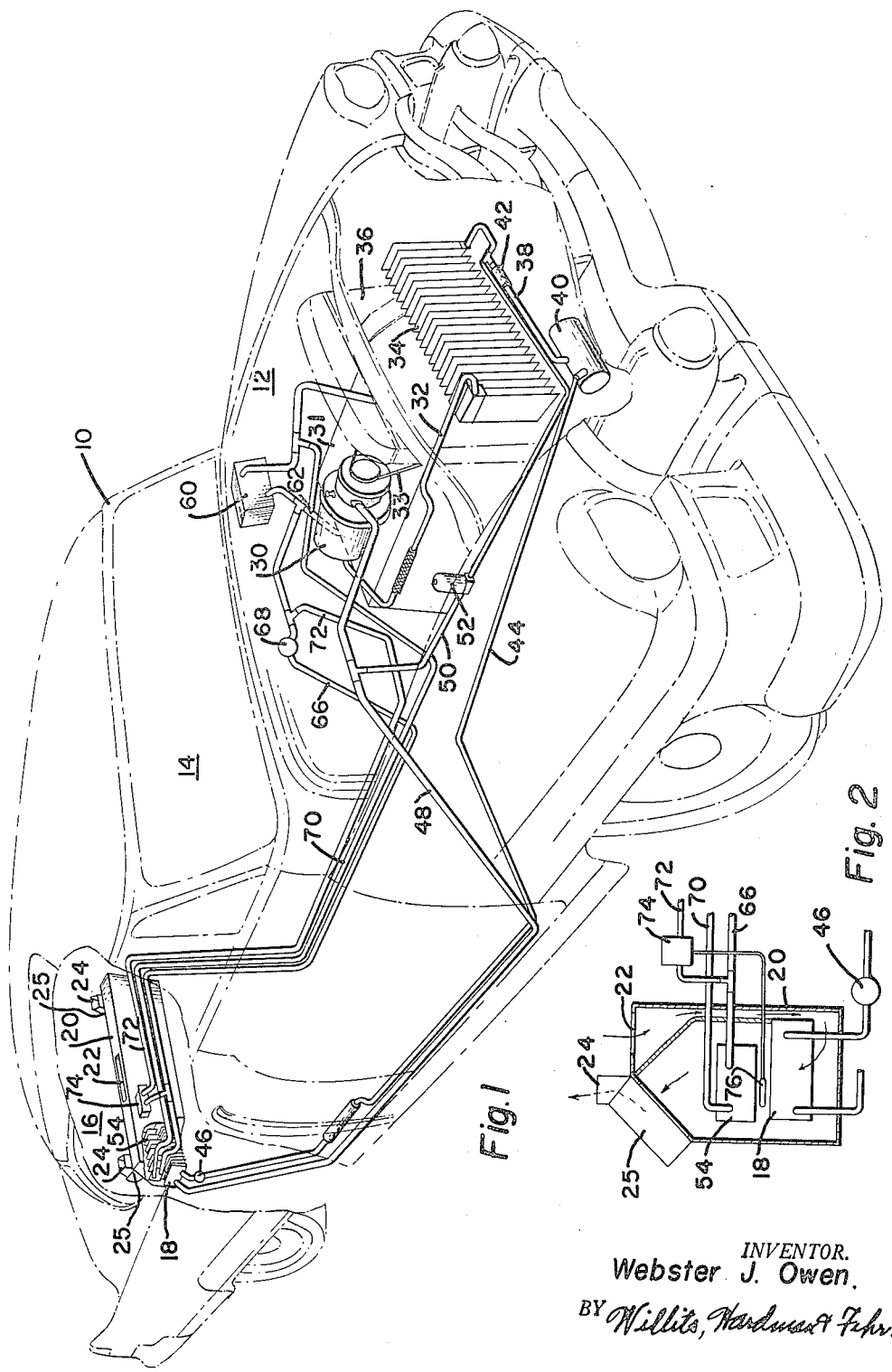
INVENTOR.
Webster J. Owen.
BY Willits, Hardman & Fehr
Attorneys.

United States Patent Office 2,735,657
Patented Feb. 21, 1956

2,735,657

REFRIGERATING APPARATUS FOR AUTOMOBILES WITH REHEAT MEANS

Webster J. Owen, Birmingham, Mich., assignor to General Motors Corporation, Detroit, Mich., a corporation of Delaware Application January 19, 1953, Serial No. 331,985

2 Claims. (Cl. 257—3)

This invention relates to refrigerating apparatus and more particularly to an improved method and apparatus for conditioning the air for a passenger compartment of a car.

It is an object of this invention to provide an improved arrangement for modulating the temperature of the conditioned air by reheating the cooled air leaving the evaporator by means of water from the engine cooling system.

One of the problems of an arrangement of the above mentioned type is that of preventing freeze-up of the water in the reheat coil when no reheating is required. It is an object of this invention to provide a simple arrangement for preventing such freeze-up.

Further objects and advantages of the present invention will be apparent from the following description, reference being had to the accompanying drawings, wherein a preferred form of the present invention is clearly shown.

In the drawings:

Figure 1 is a perspective view partly in phantom showing somewhat diagrammatically the arrangement of the air conditioning equipment within a passenger automobile; and Figure 2 is a fragmentary sectional view somewhat diagrammatic showing the arrangement of the air tempering coils within the air conditioning housing.

Referring now to the drawings wherein a preferred embodiment of my invention has been shown, reference numeral 10 generally designates a conventional passenger automobile having an engine compartment 12, a passenger compartment 14 and the usual luggage compartment 16. The air conditioning equipment comprises an evaporator 18 mounted within a housing 20 located within the luggage compartment 16 preferably at a point directly beneath the usual package shelf. The air to be conditioned enters the housing 20 through an inlet 22 located directly behind the rear seat of the passenger automobile and the conditioned air is discharged through a pair of outlets 24 which for purposes of illustration have been shown adjacent the opposite rear corners of the passenger compartment. A pair of fans 25 are used for circulating the air to be conditioned through the housing.

For purposes of illustrating the invention, the evaporator housing 20 has been shown located in the luggage compartment at a point directly behind the rear seat and directly below the usual package shelf whereas certain aspects of the invention are equally applicable to any other arrangement of the evaporator housing. The arrangement of the parts within the housing may also be varied without departing from the spirit of my invention. For a more complete description of the preferred arrangement of parts within the evaporator housing and the details of the refrigeration system per se reference is hereby made to pending application Serial No. 266,718 filed January 16, 1952.

For purposes of illustrating this invention, the refrigerant liqufying apparatus diagrammatically shown herein corresponds to the refrigerant liquefying apparatus disclosed in said above mentioned application and includes a sealed rotary compressor 30 which is adapted to be directly driven from the main car engine 31 through a belt 33. The compressed refrigerant flows from the compressor through a line 32 which leads to a condenser 34 mounted in front of the main engine radiator 36. The condensed refrigerant flows from the condenser 34 through a line 38 which leads to a liquid refrigerant receiver 40 which is also located in front of the engine radiator as shown. A check valve 42 is provided in the line 38 and prevents the reverse flow of refrigerant through the same. The liquid refrigerant flows from the receiver 40 through a line 44 which leads to the evaporator 18. An expansion valve 46 controls the flow of refrigerant to the evaporator 18 in accordance with standard practice.

The vaporized refrigerant returns to the compressor through the vapor line 48. Inasmuch as there will be times when no refrigeration whatsoever is required, such as during the winter season, a by-pass line 50 has been provided as shown for by-passing refrigerant from the outlet of the condenser to the inlet of the compressor. For purposes of illustration, a solenoid valve 52 has been shown in the by-pass line 50 whereas this valve could be a manually operated valve insofar as certain aspects of this invention are concerned.

There are times when no cooling may be required but the humidity within the passenger compartmnt becomes excessive such as on a cold, rainy day when it is necessary to keep the windows closed. Under such conditions it is desirable to provide means for removing the excess moisture from the air without appreciably cooling the air. This may be done by first cooling the air so as to condense out moisture and then reheating the cooled air. For this purpose there is provided a reheat coil 54 directly above the evaporator 18 for reheating the air cooled by the evaporator. In the installation shown, a conventional hot water heater 60 is used for supplying some or all of the heat to the passenger compartment during the winter season. The reheating coil 54 could, if desired, be used to furnish some or all of the heat for the passenger compartment during the winter season when the refrigeration system is shut off.

Hot water from the engine 31 enters a hot water line 62 which has one branch line leading to the heater 60 and a second branch line 66 in which a control valve 68 is located. The valve 68 may be a manually adjustable valve controllable from the instrument panel of the car or it may be a thermostatically operated valve which automatically serves to supply hot water to the reheat coil whenever the temperature in the passenger compartment falls below a predetermined value. The hot water flowing through the line 66 will give up much of its heat to the air leaving the evaporator 18 and will then return through the line 70 to be reheated by the car engine.

Since there may be times when the temperature of the air leaving the evaporator will be low enough to cause freezing of the water in the reheat coil 54 when the valve 68 is closed, it is necessary to provide some means for preventing such freeze-up. In the system shown, a by-pass line 72 has been shown as indicated for by-passing the valve 68. The flow of water through the by-pass line 72 is controlled by means of a thermostatic control 74 which has a thermostatic element 76 located in the evaporator housing 20 so as to automatically cause the control 74 to turn on the flow through by-pass valve 72 when the temperature of the air flowing over the water coil falls below a safe value.

While the form of embodiment of the invention as herein disclosed constitutes a preferred form, it is to be understood that other forms might be adopted, as may come within the scope of the claims which follow.

What is claimed is as follows:

1. In an air conditioning system for use in conditioning the passenger compartment of a car of the type having a main engine for propelling said car and provided with a cooling system using a liquid such as water for dissipating the engine heat, an evaporator, means for circulating air to be conditioned in thermal exchange relationship with said evaporator, refrigerant liquefying means for supplying liquid refrigerant to said evaporator, means for reducing the cooling capacity of said evaporator when said evaporator has excess cooling capacity comprising means for reheating the effective air leaving said evaporator, said last named means including a reheat coil and means for circulating liquid from the car engine cooling system through said reheat coil, control means responsive to the temperature of the air in said passenger compartment for controlling the flow of said liquid from said engine to said reheat means to maintain comfort within said passenger compartment, means responsive to the temperature of the air flowing from said evaporator to said reheat means for by-passing said control means and for supplying liquid from said car engine cooling system to said reheat coil whenever the temperature of the air leaving said evaporator falls below the freezing point of said liquid so as to prevent freeze-up of said liquid in said reheat coil.

2. In an air conditioning system for use in conditioning the passenger compartment of a car of the type having a main engine for propelling said car and provided with a cooling system using a liquid such as water for dissipating the engine heat, an evaporator, means for circulating air to be conditioned in thermal exchange relationship with said evaporator, refrigerant liquefying means for supplying liquid refrigerant to said evaporator, means for reducing the effective cooling capacity of said evaporator when said evaporator has excess cooling capacity comprising means for reheating the air leaving said evaporator, said last named means including a reheat coil and means for circulating liquid from the car engine cooling system through said reheat coil, control means for controlling the flow of said liquid from said engine to said reheat means to maintain comfort within said passenger compartment, means responsive to the temperature of the air flowing from said evaporator to said reheat means for by-passing said control means and for supplying liquid from the car engine cooling system to said reheat coil whenever the temperature of the air leaving said evaporator falls below the freezing point of said liquid so as to prevent freeze-up of said liquid in said reheat coil, and means within said passenger compartment for manually operating said control means.

References Cited in the file of this patent

UNITED STATES PATENTS

| | | |
|---|---|---|
| 2,180,760 | Mayo | Nov. 21, 1939 |
| 2,180,943 | Peo | Nov. 21, 1939 |
| 2,341,781 | Hornaday | Feb. 15, 1944 |
| 2,355,040 | Alexander et al. | Aug. 8, 1944 |
| 2,426,827 | Hemming et al. | Sept. 2, 1947 |
| 2,468,626 | Graham | Apr. 26, 1949 |